US012532276B2

(12) United States Patent
Miao et al.

(10) Patent No.: US 12,532,276 B2
(45) Date of Patent: Jan. 20, 2026

(54) METHOD FOR TRANSMITTING INFORMATION FOR DETERMINING TIME DIFFERENCE INFORMATION AMONG NODES OF A NETWORK

(71) Applicant: ZTE CORPORATION, Guangdong (CN)

(72) Inventors: Ting Miao, Shenzhen (CN); Weimin Xing, Shenzhen (CN); Feng Bi, Shenzhen (CN); Youxiong Lu, Shenzhen (CN); Wenhao Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 733 days.

(21) Appl. No.: 17/876,625

(22) Filed: Jul. 29, 2022

(65) Prior Publication Data

US 2022/0369254 A1 Nov. 17, 2022

Related U.S. Application Data

(63) Continuation of application No. PCT/CN2020/075166, filed on Feb. 14, 2020.

(51) Int. Cl.
*H04W 56/00* (2009.01)

(52) U.S. Cl.
CPC ................................ *H04W 56/002* (2013.01)

(58) Field of Classification Search
CPC .... H04L 5/14; H04W 56/002; H04W 56/0045
See application file for complete search history.

(56) References Cited

U.S. PATENT DOCUMENTS 10,433,268 B2 * 10/2019 Yilmaz ................. H04L 5/0007
11,012,964 B2 * 5/2021 Korhonen ......... H04W 56/0045
11,184,869 B2 * 11/2021 Abedini ........... H04W 56/0015
11,564,191 B2 * 1/2023 Park ...................... H04W 56/00
11,997,628 B2 * 5/2024 Keskitalo ............ H04W 56/001
2016/0014706 A1 * 1/2016 Vajapeyam ......... H04W 56/001
370/328

(Continued)

FOREIGN PATENT DOCUMENTS

CN 109151983 A 1/2019
CN 110535677 A 12/2019

(Continued)

OTHER PUBLICATIONS

First Office Action for CN Appl. No. 202080094927.X, dated May 7, 2024 (with English translation, 23 pages).

(Continued)

*Primary Examiner* — Bailor C Hsu
(74) *Attorney, Agent, or Firm* — Foley & Lardner LLP

(57) ABSTRACT

A system and method for receiving timing information are disclosed herein. In one embodiment, a method performed by a first node includes receiving, by a first node from a second node, one of (1) first information and second information, or (2) third information. The first information includes configuration information of at least one of indication information, timing mode, or time resource type. The method includes determining, by the first node, time difference information according to the one of (1) the first information and the second information, or (2) the third information.

12 Claims, 11 Drawing Sheets

900

Receive, from a second node, one of (1) first information and second information, or (2) third information wherein the first information comprises configuration information of at least one of indication information, timing mode, or time resource type.

902

Determine time difference information according to the one of (1) the first information and the second information, or (2) the third information.

904

(56) References Cited

U.S. PATENT DOCUMENTS

| | | | | |
|---|---|---|---|---|
| 2018/0115453 | A1* | 4/2018 | Sadek | H04J 3/0682 |
| 2019/0289618 | A1 | 9/2019 | Dudda et al. | |
| 2019/0349036 | A1 | 11/2019 | Wang et al. | |
| 2019/0349871 | A1 | 11/2019 | Ghosh et al. | |
| 2019/0394738 | A1 | 12/2019 | Abedini et al. | |
| 2020/0015316 | A1 | 1/2020 | Islam et al. | |
| 2020/0053679 | A1 | 2/2020 | Bendlin et al. | |
| 2020/0053682 | A1* | 2/2020 | Abedini | H04W 56/0045 |
| 2021/0068092 | A1* | 3/2021 | Abedini | H04W 56/001 |
| 2021/0251043 | A1* | 8/2021 | Abedini | H04W 88/14 |
| 2022/0078738 | A1* | 3/2022 | Zhang | H04L 5/0091 |
| 2022/0124652 | A1* | 4/2022 | Wanuga | H04W 56/0015 |
| 2023/0209483 | A1* | 6/2023 | Rudolf | H04W 56/0045 370/503 |
| 2024/0334360 | A1* | 10/2024 | Bai | H04W 56/005 |

FOREIGN PATENT DOCUMENTS

| | | | |
|---|---|---|---|
| CN | 110536406 | A | 12/2019 |
| CN | 110536407 | A | 12/2019 |
| CN | 110536466 | A | 12/2019 |
| CN | 110691408 | A | 1/2020 |
| IN | 201927050533 | A | 12/2019 |
| WO | WO-2019/246248 | A1 | 12/2019 |

OTHER PUBLICATIONS

Huawei et al., "T_delta of IAB DL transmission timing alignment", 3GPP TSG-RAN WG2 Meeting #108, R2-1915465, Nov. 22, 2019, Reno, USA (3 pages).

International Search Report and Written Opinion for PCT Appl. No. PCT/CN2020/075165 mailed Nov. 19, 2020 (9 Pages).

International Search Report and Written Opinion for PCT Appl. No. PCT/CN2020/075166 mailed Nov. 6, 2020. (8 pages).

Nokia, et al.: IAB Synchronization 3GPP TSG RAN WGI Meeting #93, RI-1806664, May 12, 2018(May 12, 2018) section 2.2 Busan, Korea (5 pages).

Zte et al.: "Summary of offline discussion on 38.213 CR text for case-1 timing" RI-1913316, 3GPP TSG RAN WGI Meeting #99 Nov. 25, 2019(Nov. 25, 2019)Reno, USA (8 pages).

* cited by examiner

| SCS [kHz] | Max $T_{delta}$ [Tc] | Min $T_{delta}$ [Tc] |
|---|---|---|
| 15 | $-N_{TA\ offset}/2+6256$ | $-N_{TA\ offset}/2-70528$ |
| 30 | $-N_{TA\ offset}/2+6128$ | $-N_{TA\ offset}/2-35328$ |
| 60 | $-N_{TA\ offset}/2+6032$ | $-N_{TA\ offset}/2-17664$ |
| 120 | $-N_{TA\ offset}/2+6032$ | $-N_{TA\ offset}/2-8816$ |

Figure 2

Table a

| SCS [kHz] | Max $T_{delta}$ [Tc] | Min $T_{delta}$ [Tc] |
|---|---|---|
| 15 | Max_a1 | Min_a1 |
| 30 | Max_a2 | Min_a2 |
| 60 | Max_a3 | Min_a3 |
| 120 | Max_a4 | Min_a4 |

Figure 3

Table b

| SCS [kHz] | Max $T_{delta}$ [Tc] | Min $T_{delta}$ [Tc] |
|---|---|---|
| 15 | Max_b1 | Min_b1 |
| 30 | Max_b2 | Min_b2 |
| 60 | Max_b3 | Min_b3 |
| 120 | Max_b4 | Min_b4 |

Figure 4

Table c

| index | SCS [kHz] | Max $T_{delta}$ [Tc] | Min $T_{delta}$ [Tc] |
|---|---|---|---|
| 0 | 15 | Max_a1 | Min_a1 |
| 1 | 30 | Max_a2 | Min_a2 |
| 2 | 60 | Max_a3 | Min_a3 |
| 3 | 120 | Max_a4 | Min_a4 |
| 4 | 15 | Max_b1 | Min_b1 |
| 5 | 30 | Max_b2 | Min_b2 |
| 6 | 60 | Max_b3 | Min_b3 |
| 7 | 120 | Max_b4 | Min_b4 |

Figure 5

Table d

| index | $T_{delta}$ [Tc] |
|---|---|
| 0 | $D_1$ |
| 1 | $D_2$ |
| 2 | $D_3$ |
| ...... | ...... |
| N-1 | $D_{N-1}$ |

Figure 6

Table e

| index | $T_{delta}$ [Tc] |
|---|---|
| 0 | $E_1$ |
| 1 | $E_2$ |
| 2 | $E_3$ |
| ...... | ...... |
| M-1 | $E_{M-1}$ |

Figure 7

Table f

| index | $T_{delta}$ [Tc] |
|---|---|
| 0 | $F_1$ |
| 1 | $F_2$ |
| 2 | $F_3$ |
| …… | …… |
| N-1 | $F_{N-1}$ |
| N | $F_N$ |
| …… | …… |
| N+M-1 | $F_{N+M-1}$ |

Figure 8

METHOD FOR TRANSMITTING INFORMATION FOR DETERMINING TIME DIFFERENCE INFORMATION AMONG NODES OF A NETWORK

CROSS-REFERENCE TO RELATED APPLICATION

This application claims the benefit of priority under 35 U.S.C. § 120 as a continuation of PCT Patent Application No. PCT/CN2020/075166, filed on Feb. 14, 2020, the disclosure of which is incorporated herein by reference in its entirety.

TECHNICAL FIELD

The disclosure relates generally to wireless communications and, more particularly, to systems and methods for transmitting information used in determining the time difference information among nodes of a network.

BACKGROUND

The new-generation mobile communication system NR (new radio) allows more flexible network deployment than 2G, 3G, and 4G systems. Currently, a new type of node that integrates the backhaul link and the normal access link, that is, the IAB node (Integrated Access and Backhaul Node), can provide more flexible coverage and network deployment than a single cellular without the need of laying a large number of optical fibers, saving network deployment costs.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a first node includes receiving, by a first node from a second node, one of (1) first information and second information, or (2) third information. The first information includes configuration information of at least one of indication information, timing mode, or time resource type. The method includes determining, by the first node, time difference information according to the one of (1) the first information and the second information, or (2) the third information.

In another embodiment, a method performed by a second node includes sending, by a second node to a first node, one of (1) first information and second information, or (2) third information. The first information includes configuration information of at least one of indication information, timing mode, or time resource type. The method includes determining, by the first node, time difference information according to the one of (1) the first information and the second information, or (2) the third information.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 2 illustrates a table of time difference information, in accordance with some embodiments of the present disclosure.

FIG. 3 illustrates a time difference information table, in accordance with some embodiments of the present disclosure.

FIG. 4 illustrates a time difference information table, in accordance with some embodiments of the present disclosure.

FIG. 5 illustrates a time difference information table, in accordance with some embodiments of the present disclosure.

FIG. 6 illustrates a time difference information table, in accordance with some embodiments of the present disclosure.

FIG. 7 illustrates a time difference information table, in accordance with some embodiments of the present disclosure.

FIG. 8 illustrates a time difference information table, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

For a new generation mobile communication system, a node that has a wired backhaul link with the core network is a donor integrated access and backhaul (IAB) (IAB donor). The IAB donor includes a centralized unit (CU) and one or more distributed units (DUs) that can obtain downlink data or send uplink data to the core network. A node that is connected wirelessly to the donor IAB (or the upper-layer IAB node) is an IAB node. There is no direct connection between the IAB node and the core network. Its interaction with the core network is forwarded one or more times, and realized by the donor IAB. Both the donor IAB and the IAB node support terminal access.

The IAB node has two functions. The first function is a distributed unit DU function. An IAB node operating in its DU function behaves as a base station. That is, the IAB node can provide wireless access function for the child node or terminal. The second function is a mobile terminal (MT, Mobile-Termination) function. An IAB node operating in its MT function behaves as a terminal. That is, the IAB node is controlled and scheduled by the parent node (IAB node or donor IAB).

Figure 1:
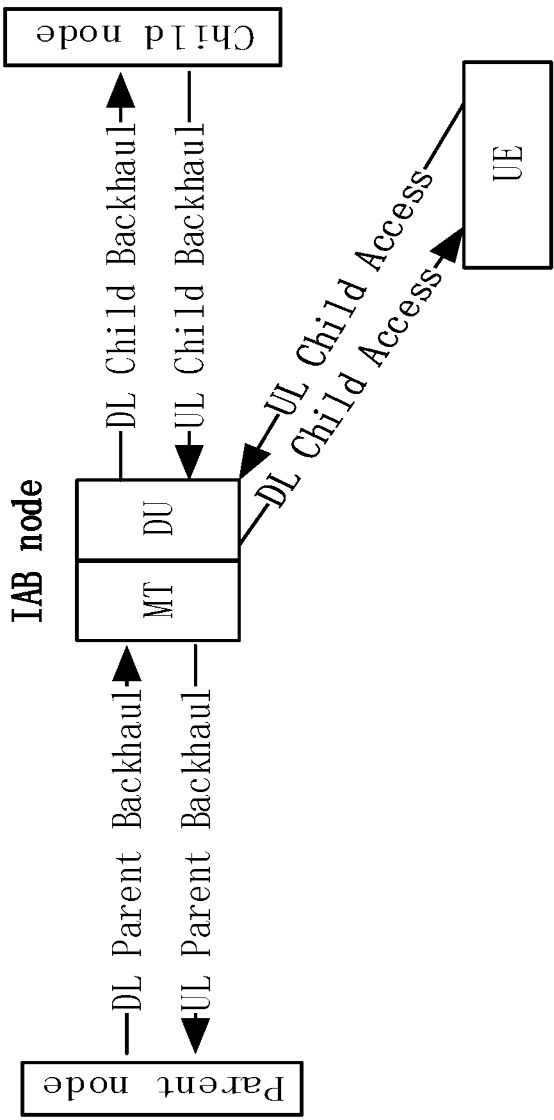
FIG. 1 illustrates relationships and links of among nodes, in accordance with some embodiments of the present disclosure.

FIG. 1 shows the relationships and links of among nodes. The IAB node is used as a reference. The parent node of the IAB node can be a IAB node or a donor IAB. The next-level node of the IAB node can be at least one of: a) another IAB node (Child node), or b) a UE. The link between an IAB node and its parent node is called a parent backhaul link and it is divided into a downlink parent backhaul link (DL Parent Backhaul) and an uplink parent backhaul link (UL Parent Backhaul link). The links between an IAB node and its child node is called child backhaul link and is divided into a downlink child backhaul link (DL Child Backhaul) and an uplink child backhaul links (UL Child Backhaul). The link between the IAB node and the UE it serves is called a child access link and it is divided into a downlink child access link (DL Child access) and an uplink child access link (UL Child access).

The IAB needs to study the following timings: Case 1-DL transmission timing alignment across IAB-nodes and IAB-donors; Case 6-DL transmission timing for all IAB-nodes is aligned with the parent IAB-node or donor DL timing, and UL transmission timing of an IAB-node can be aligned with the IAB-node's DL transmission timing; and Case 7-DL transmission timing for all IAB-nodes is aligned with the parent IAB-node or donor DL timing, and UL reception timing of an IAB-node can be aligned with the IAB-node's DL reception timing;

For Case 1, the IAB node uses the same method as a UE to determine the uplink transmission (e.g., UL Tx) timing, that is, for the IAB node, an advance amount for UL Tx timing $UL_{Tx}$ relative to (e.g., with respect to) downlink reception (e.g., DL Rx) timing $DL_{Rx}$ is $(N_{TA}+N_{TA,offset})\cdot T_c$. Accordingly, $UL_{Tx}=DL_{Rx}-(N_{TA}+N_{TA,offset})\cdot T_c$.

The $N_{TA}$ is calculated according to the timing advance TA value indicated by the timing advance command in the random access response or calculated based on the current timing advance TA value of the IAB node and the timing advance adjustment amount indicated by the timing advance command media access control (MAC) control element (CE) relative to the current TA value. $N_{TA,offset}$ is the offset value for timing advance (timing advance offset). $T_c$ is the time unit of the NR system.

For Case 1, in response to determining that $(N_{TA}+N_{TA,offset})\cdot T_c/2+T_{delta}$ is greater than 0, the IAB node adjusts its downlink transmission (e.g., DL Tx) timing $DL_{Tx}$ based on this value $(N_{TA}+N_{TA,offset})\cdot T_c/2+T_{delta}$ relative to DL Rx timing $DL_x$. That is, for the IAB node, the advance amount for DL Tx timing $DL_{Tx}$ relative to the downlink reception timing $DL_{Rx}$ is $(N_{TA}+N_{TA,offset})\cdot T_c/2+T_{delta}$.

$T_{delta}$ is a parameter that corresponds to (−1/2) of time interval at the parent node between the start of uplink reception (e.g., UL RX) frame i for the IAB node and the start of DL Tx frame i. It can be understood as the time difference information is between UL RX timing $UL_{Rx,p}$ and DL Tx timing $DL_{Tx,p}$ of the serving cell (parent node). For example, it is 0.5 times the time difference (i.e. $UL_{Rx,p}$ minus $DL_{Tx,p}$). An example of value range of $T_{delta}$ is shown in FIG. 2.

For TDD systems, the minimum value of $N_{TA\_offset}$ is 13792 $T_c$, $-N_{TA\_offset}/2=-6896\ T_c$, So, for Case 1, $T_{delta}$ is negative. For Case 6 and Case 7, Because it is necessary to meet the Case 1 timing, that is, the DL Tx timing of the IAB node is aligned with the DL Tx timing of the parent node, it still needs $(N_{TA}+N_{TA,offset})\cdot T_c/2+T_{delta}$ to be greater than 0.

For Case 6, because the IAB node's DL Tx timing and UL Tx timing are aligned, it is assumed that the IAB node's UL Tx timing and DL Tx timing are calculated using the case 1 timing method, The propagation delay $T_p$ between the IAB node and the parent node is greater than 0. Thus, $T_{delta}$ is greater than 0.

$$(N_{TA}+N_{TA,offset})\cdot T_c/2+T_{delta}=(N_{TA}+N_{TA,offset})\cdot T_c=T_p>0$$

$$T_{delta}=(N_{TA}+N_{TA,offset})\cdot T_c/2=T_p/2>0$$

$$T_{delta}>0$$

For Case 7, because Case 7 needs to align the downlink reception timing and uplink reception timing of the IAB node, it may happen that the timing advance is negative, that is, $(N_{TA}+N_{TA,offset})\cdot T_c$ is less than 0. Thus, when $(N_{TA}+N_{TA,offset})\cdot T_c$ is less than 0, $T_{delta}$ is greater than 0.

$$(N_{TA}+N_{TA,offset})\cdot T_c/2+T_{delta}>0$$

$$T_{delta}>-(N_{TA}+N_{TA,offset})\cdot T_c/2>0$$

$$T_{delta}>0$$

That is, for both Case 6 and Case 7 timings, $T_{delta}$ is a positive value. Therefore, the range of $T_{delta}$ needs to be expanded to include positive values comparing with range of $T_{delta}$ in Case 1 timing. If frequency domain multiplexing (FDM) or spatial domain multiplexing (SDM) between parent backhaul link and child backhaul link (or child access link) of the IAB node is used, transmitting/receiving timing alignment between the two links is needed to enable orthogonality between the two links, for interference mitigation. In order to achieve the timing alignment of the two links, an IAB node needs to exchange the information related to time different with the IAB node's parent node.

The present disclosure proposes a method for determining time difference information for determining a transmission timing and/or a reception timing of an IAB node in a case that FDM or SDM multiplexing between parent backhaul link and child backhaul link (or child access link) of the IAB node is used for simultaneous transmission/reception.

In some embodiments, the present disclosure includes a first node, a second node, and a third node. The first node can be one of the following: an IAB node or a relay node. The second node is higher layer node of the first node (e.g., a parent node of the IAB node, a parent node of a parent node of the IAB node, etc.). The second node can be one of the following: an IAB donor, a IAB node, a relay node, CU, OAM (Operation Administration and Maintenance) or a base station (e.g., a network, a gNB, an eNB, a wireless communication node, a node, a wireless communication device, and the like). The third node is lower layer node of the first node (e.g., a child node) and can be one of the following: a IAB node, relay node, or a UE (e.g., a terminal, a wireless communication device, a user equipment device, a mobile device, a mobile phone, a wireless communication node, etc.).

The IAB node uses at least one of several methods to determine the time difference information. In some embodiments, the first node (e.g., IAB node) determines one of (a) the table, (b) whether to offset, or (c) whether to reverse based on configuration information of one of (1) indication information, (2) timing mode, or (3) time resource type. In some embodiments, the first node uses one of (a)-(c) in combination with the second information to determine the time difference information. In some embodiments, the first node determines the offset based on the indication information and uses the offset in combination with the second information to determine the time difference information. In some embodiments, the first node receives, from a second node, one of (1) first information and second information, or (2) third information. The first information can include configuration information of at least one of indication information, timing mode, or time resource type. In some embodiments, the first node determines time difference information according to the one of (1) the first information and the second information, or (2) the third information. The time difference information can have a time difference value.

In some embodiments, the IAB node receives the first information and the second information, and the first information includes configuration information of at least one of the following: indication information, timing mode, and time resource type. In some embodiments, the IAB node determines a range of time difference information according to the first information, and determines time difference information according to the range of the time difference information and the second information. In some embodiments, the first node determines a range of the time difference information based on the first information. In some embodiments, the first node determines the time difference information according to the range of the time difference information and the second information.

In some embodiments, the IAB node receives the first information and the second information, and the first information includes configuration information of at least one of the following: indication information, timing mode, and time resource type. In some embodiments, the IAB node determines the time difference information offset according to the first information, and determines the time difference information according to the time difference information offset and the second information. In some embodiments, the first node determines a time difference information offset based on the first information. The time difference information offset can be an offset relative to the first time difference information corresponding to a specific timing scene, or an offset relative to the first time difference value indicated by the second information. In some embodiments, the first node determines whether to offset from the first time difference value indicated by the second information based on the first information, or whether to offset from the first time difference information corresponding to a specific timing scene based on the first information. In some embodiments, the first node determines whether to reverse the first time difference value indicated by the second information based on the first information, or whether to reverse the first time difference information corresponding to a specific timing scene based on the first information.

In some embodiments, the IAB node receives the third information, and the IAB node determines the time difference information according to the third information. In some embodiments, the different bit value ranges of the third information correspond to different time difference information tables. In some embodiments, the third information includes bit value ranges, and different bit value ranges correspond to different time difference information tables or different time difference information ranges, and the time difference information is determined according to the third information.

In some embodiments, the first node determines the time difference information according to the time difference information offset and the second information. In some embodiments, the first node determines the time difference value based on the second information and whether to offset from the first time difference value or the first time difference information. In some embodiments, the first node determines the time difference value based on the second information and whether to reverse the first time difference value or the first time difference information.

Optionally, the first information and the second information may be provided in one of several ways. In some embodiments, the first information is provided through higher layer signaling, and the second information is provided through MAC CE. In some embodiments, the first information and the second information are provided through higher layer signaling. In some embodiments, the first information and the second information are provided through a MAC CE. In some embodiments, (1) the first information is received by the first node via higher layer signaling, and the second information is received by the first node via Media Access Control (MAC) Control Element (CE), (2) the first information and the second information are received by the first node via the higher layer signaling, or (3) the first information and the second information are received by the first node via MAC CE.

Optionally, the time difference information offset is an offset from first time difference information corresponding to a specific timing scene, or an offset relative to the first time difference value indicated by the second information. Optionally, the time difference information is one of: (1) 1/N times the time difference between the DL Tx timing and the UL Rx timing of the parent node, (2) (−1/N) of a time interval at a parent IAB node in the IAB network between a start of a UL Rx frame i for the IAB node and a start of a DL Tx frame i, or (3) (−1/N) of a time interval at a parent IAB node in the IAB network between a start of a UL Rx frame i and a start of a DL Tx frame i, where N is an integer greater than or equal to 1. In some embodiments, N is equal to 2.

Optionally, the third information is provided through higher layer signaling or MAC CE. In some embodiments, the third information is received by the first node via Media Access Control (MAC) Control Element (CE).

Optionally, the IAB node receives relative time difference information, where the relative time difference information is an adjustment amount relative to time difference information at a specific moment. That is, the time difference information obtained by the IAB node is the sum of the time difference information at a specific moment and the adjustment amount. In some embodiments, the first node receives relative time difference information. The relative time difference information can include an adjustment amount relative to the time difference information at a specific moment. In some embodiments, the time difference information received by the first node is a sum of the time difference information at the specific moment in time and the adjustment amount.

Optionally, when receiving the relative time difference information, the IAB node adjusts the UL Tx timing and the DL Tx timing. In some embodiments, in response to receiving the time difference information, the first node adjusts at least one of UL Tx timing or DL Tx timing.

Optionally, the range of the relative time difference information is a subset of the range of the time difference information or is separately defined. In some embodiments, a range of the relative time difference information is a subset of a range of the time difference information. In some embodiments, the range of the relative time difference information is defined separately from the range of the time difference information. For example, the relative time difference information may be an adjustment amount relative to the most recently time difference information.

In some embodiments, the configuration information of time resource type is used to indicate a type of the time resource (e.g., whether the time resource is the first type resource or the second type resource). The first type resource refers to one or more time resources that are used for TDM multiplexing between parent backhaul link and child backhaul link (or child access link). The second type resource refers to one or more time resources that are used for FDM or SDM multiplexing between parent backhaul link and child backhaul link (or child access link).

In some embodiments, the second information indicates the first time difference value (e.g., $T_{delta}$ value) through an index (e.g., $T_{delta}$ index). In some embodiments, a $T_{delta}$ index points to a particular $T_{delta}$ value in a selected/determined $T_{delta}$ value range. In some embodiments, $T_{delta}$ corresponds to (−½) of a time interval at a parent node between a start of a UL Rx frame i for the IAB node and a start of a DL Tx frame i or (−½) of a time interval at a parent node between a start of a UL Rx frame i and a start of a DL Tx frame i.

FIG. 3 illustrates a first time difference information table (e.g., "table a") and FIG. 4 illustrates a second time difference information table (e.g., "table b"). FIG. 5 illustrates a table of a first time difference information and a second time difference information (e.g., "table c"). Tables a and b (generally, referred to as "tables") may correspond to different sets/groups of $T_{delta}$ ranges. Each $T_{delta}$ range of the set of $T_{delta}$ ranges in a given table can correspond to a subcarrier spacing (SCS). Table a and b corresponds to different timing modes, or different resource multiplexing type (e.g. TDM, FDM, SDM). For example, the $T_{delta}$ values is shown in table a for Case 1 timing. The $T_{delta}$ values is shown in table b for Case 6 and Case 7 timing. For another example, the $T_{delta}$ values is shown in table a for TDM. The $T_{delta}$ values is shown in table b for FDM or SDM. Tables a and b may also be different parts of the same table, e.g., table c. For the first subset of timing modes, $T_{delta}$ values can also be defined in a table, $T_{delta}$ values for the second subset of timing modes have a mapping relationship with the $T_{delta}$ values in the table. Or, For the first subset of multiplexing types, $T_{delta}$ values can also be defined in a table, $T_{delta}$ values for the second subset of multiplexing types have a mapping relationship with the $T_{delta}$ values in the table. For example, the mapping relationship may be an offset or opposite number between two $T_{delta}$ values.

In some embodiments, the IAB node determines which table to use, or which part of the table, and determines the value of $T_{delta}$ based on the $T_{delta}$ index. In some embodiments, the first node identifies, based on configuration information of one of (1) the indication information, (2) the timing mode, or (3) the time resource type received from the second node, a table or a portion of the table used to determine a value range of the time difference information. In some embodiments, the first node determines the time difference information according to the range of the time difference information and the second information.

Different $T_{delta}$ values can be defined for different timing modes or different resource multiplexing types. For example, timing modes include Case 1 timing, Case 6 timing, and Case 7 timing. For Case 1 timing, $T_{delta}$ values are defined as shown in table a. For Case 6 and Case 7 timing, $T_{delta}$ values are defined as shown in table b. In another example, Different $T_{delta}$ values can be defined for different resource multiplexing type between the MT and DU of the IAB node. The resource multiplexing type may include TDM, FDM, and SDM. For TDM, $T_{delta}$ values are defined as shown in table a. For FDM and SDM, $T_{delta}$ values are defined as shown in table b. In another example, $T_{delta}$ values for Case 1, Case 6 and Case 7 timing are defined as shown in table c. The first subset of rows (e.g., corresponding to indices from 0 to 3) of the table c is for Case 1 timing. The second subset of rows (e.g., corresponding to indices from 4 to 7) of the table c is for Case 6 and Case 7 timing. In another example, $T_{delta}$ values for TDM, FDM and SDM are defined as shown in table c. The first subset of rows (e.g., corresponding to indices from 0 to 3) of the table c is for TDM. The second subset of rows (e.g., corresponding to indices from 4 to 7) of the table c is for FDM and SDM.

FIG. 6 illustrates a first time difference information table (e.g., "table d") and FIG. 7 illustrates a second time difference information table (e.g., "table e"). FIG. 8 illustrates a table of a first time difference information and a second time difference information (e.g., "table f"). Optionally, different $T_{delta}$ values can be defined for different timing modes or different resource multiplexing types. For example, for Case 1 timing, $T_{delta}$ values are defined as shown in table d. For Case 6 and Case 7 timing, $T_{delta}$ values are defined as shown in table e. In another example, for TDM, $T_{delta}$ values are defined as shown in table d. For FDM and SDM, $T_{delta}$ values are defined as shown in table e. In another example, $T_{delta}$ values for Case 1, Case 6 and Case 7 timing are defined in table f. The first subset of rows (e.g., corresponding to indices from 0 to N−1) of the table f is for Case 1 timing. The second subset of rows (e.g., corresponding to indices from N to N+M−1) of the table f is for Case 6 and Case 7 timing. In another example, $T_{delta}$ values for TDM, FDM and SDM are defined in table f. The first subset of rows (e.g., corresponding to indices from 0 to N−1) of the table f is for TDM. The second subset of rows (e.g., corresponding to indices from N to N+M−1) of the table f is for FDM and SDM. N and M in the table d, e, f are all positive integers.

In some embodiments, the IAB node determines which table to use, or which part (e.g., which subset of rows) of the table based on configuration information of one of indication information, timing mode, time resource type received from the higher layer node (e.g. parent node or CU). The configuration information of time resource type is used to indicate whether the time resource is the first type resource or the second type resource. The first type resource refers to one or more time resources that are used for TDM multiplexing between parent backhaul link and child backhaul link (or child access link) of the IAB node. The second type resource refers to one or more time resources that are used for FDM or SDM multiplexing between parent backhaul link and child backhaul link (or child access link) of the IAB node. For example, the indication information contains 1 bit, and different bit values indicate different $T_{delta}$ value ranges. For example, a bit value of 0 indicates that the $T_{delta}$ value ranges of table a or the first part (e.g., the first subset of rows) of table c is used. A bit value of 1 indicates that the $T_{delta}$ value ranges of table b or the second part (e.g., the second subset of rows) of table c is used. In another example, if the timing mode is configured as Case 1 timing, the $T_{delta}$ value ranges of table a or the first part of table c is used. If the timing mode is configured as at least of Case 6 timing and Case 7 timing, the $T_{delta}$ value ranges of table b or the second part of table c is used. In another example, for time resources that are configured as the first type resource, the $T_{delta}$ value ranges of table a or the first part of table c is used. For time resources that are configured the second type resource, the $T_{delta}$ value ranges of table b or the second part of table c is used. There is a mapping relationship between the $T_{delta}$ value range and the subcarrier spacing configuration. For example, for the subcarrier spacing configuration u=0 (that is, the subcarrier spacing is $2^u \cdot 15$ kHz, i.e., 15 kHz), the IAB node can determine the $T_{delta}$ value range to be [Min_a1, Max_a1].

The IAB node can determine the value range of $T_{delta}$ according to the selected/determined table and the configured subcarrier spacing. The subcarrier spacing configuration corresponding to the $T_{delta}$ value range is provided by the parent node. The IAB node can obtain the value of $T_{delta}$ according to the $T_{delta}$ index and the determined $T_{delta}$ value range. There is a mapping relationship between the $T_{delta}$ value and $T_{delta}$ index for each subcarrier spacing. For example, for the $T_{delta}$ value range is [Min_a1, Max_a1], the granularity is K (unit $T_c$), and the $T_{delta}$ index i, the IAB node can determine the $T_{delta}$ value to be Min_a1+K·i, wherein i is a non-negative integer.

In some embodiments, the IAB node determines which table to use, or which part (e.g., which subset of rows) of the table based on configuration information of one of indication information, timing mode, time resource type. For example, the indication information contains 1 bit, and different bit values indicate different tables or different parts of a table. For example, a bit value of 0 indicates that the table d or the first part of table f is used. A bit value of 1 indicates that the table e or the second part of table f is used. In another example, if the timing mode is configured as Case 1 timing, the table d or the first part of table f is used. If the timing mode is configured as at least of Case 6 timing and Case 7 timing, the table e or the second part of table f is used. In another example, for time resources that are configured as the first type resource, the table d or the first part of table f is used. For time resources that are configured the second type resource, the table e or the second part of table f is used.

The IAB node can determine the $T_{delta}$ value according to the determined table and $T_{delta}$ index received from the higher layer node. A $T_{delta}$ value is identified by a corresponding $T_{delta}$ index as provided in the determined table. Alternatively, the IAB node can determine the $T_{delta}$ value according to the determined part of table and $T_{delta}$ index received from the higher layer node (e.g., parent node). A $T_{delta}$ value is identified by a corresponding $T_{delta}$ index as provided in the determined part of table.

The configuration information of time resource type is similar to the foregoing embodiment.

It is worth noting that IAB nodes can obtain at least one of the subcarrier spacing configuration and $T_{delta}$ index from the higher layer node. For example, at least one of the subcarrier spacing configuration and the $T_{delta}$ index is obtained through at least one of higher layer signaling and MAC CE.

In some embodiments, the IAB node determines whether $T_{delta}$ value takes the opposite number according to the configuration information of one of indication information, timing mode, time resource type received from the higher layer node, and determines the value of $T_{delta}$ according to whether $T_{delta}$ value takes the opposite number and the $T_{delta}$ index. In some embodiments, the first node determines, based on configuration information of one of (1) indication information, (2) timing mode, or (3) time resource type received from the second node, whether to reverse/takes the opposite number of the first time difference value indicated by the second information or the first time difference information corresponding to a specific timing scene. In some embodiments, the first node determines the time difference value based on the second information and whether to reverse the first time difference value indicated by the second information.

In some embodiments, whether $T_{delta}$ takes the opposite number can be pre-defined for different timing modes or different time resource types. For example, for Case 1 timing, the IAB node determines the $T_{delta}$ value without using the opposite number. For Case 6 and Case 7 timing, the IAB node determines the $T_{delta}$ value using the opposite number. In another example, for TDM, the IAB node determines the $T_{delta}$ value without using the opposite number. For FDM and SDM, the IAB node determines the $T_{delta}$ value after using the opposite number.

In some embodiments, the IAB node determines whether $T_{delta}$ value takes the opposite number based on configuration information of one of indication information, timing mode, time resource type, and determines the value of $T_{delta}$ based on the $T_{delta}$ index and whether $T_{delta}$ value takes the opposite number. For example, the $T_{delta}$ values are defined as shown in table a. The IAB node determines the first $T_{delta}$ value based on the subcarrier spacing configuration, $T_{delta}$ index, and table a (e.g., using a similar way as foregoing embodiments). In another example, the $T_{delta}$ values are defined as shown in table d. The IAB node determines the first $T_{delta}$ value based on the $T_{delta}$ index and table d (e.g., using a similar way as foregoing embodiments). In another example, The indication information contains 1 bit, and different bit values indicate whether $T_{delta}$ value takes the opposite number of the first $T_{delta}$ value. If the value of indication information is 0, the IAB node determines that the $T_{delta}$ value equals to the first $T_{delta}$ value. If the value of indication information is 1, the IAB node determines that the $T_{delta}$ value equals to the opposite number of the first $T_{delta}$ value. In another example, different timing modes indicate whether $T_{delta}$ value takes the opposite number of the first $T_{delta}$ value. If the timing mode is configured as Case 1 timing, the IAB node determines that the $T_{delta}$ value equals to the first $T_{delta}$ value. If the timing mode is configured as at least of Case 6 timing and Case 7 timing, the IAB node determines that the $T_{delta}$ value equals to the opposite number of the first $T_{delta}$ value. In another example, different time resource types indicate whether $T_{delta}$ value takes the opposite number of the first $T_{delta}$ value. For time resources that are configured as the first type resource, the IAB node determines that the $T_{delta}$ value equals to the first $T_{delta}$ value. For time resources that are configured the second type resource, the IAB node determines that the $T_{delta}$ value equals to the opposite number of the first $T_{delta}$ value.

Alternatively, the IAB node may determine whether to use the opposite number based on the timing mode or the time resource type. For example, when the timing mode is Case 1 timing, IAB node does not use the opposite number to determine the $T_{delta}$ value. When the timing mode is Case 6 or Case 7 timing, IAB node uses the opposite number to determine the $T_{delta}$ value. In another example, when the time resource type is a TDM multiplexed time resource, IAB node does not use the opposite number to determine the $T_{delta}$ value. When the time resource type is a FDM or SDM multiplexed time resource, IAB node uses the opposite number to determine the $T_{delta}$ value.

In some embodiments, the mapping relationship between whether takes the opposite number of the first $T_{delta}$ value and any of indication information, timing mode, or time resource type can be predefined.

In some embodiments, the IAB node determines whether to offset (i.e., offset relative to) the first $T_{delta}$ value based on configuration information of one of indication information, timing mode, time resource type, and determines the value of $T_{delta}$ based on the $T_{delta}$ index and whether to offset the first $T_{delta}$ value. The offset value (e.g., $\Delta T$) can be predefined or provided by higher layer node. The first $T_{delta}$ value is determined in a similar way as foregoing embodiments. For example, the $T_{delta}$ values are defined as shown in table a. The IAB node determines the first $T_{delta}$ value based on the subcarrier spacing configuration, $T_{delta}$ index and table a (e.g., using a similar way as foregoing embodiments). In another example, the $T_{delta}$ values are defined as shown in table d. the IAB node determines the first $T_{delta}$ value based on the $T_{delta}$ index and table d (e.g., using a similar way as foregoing embodiments). In another example, The indication information contains 1 bit, and different bit values indicate whether to offset the first $T_{delta}$ value. If the value of indication information is 0, the IAB node determines that the $T_{delta}$ value equals to the first $T_{delta}$ value. If the value of indication information is 1, the IAB node determines that the $T_{delta}$ value equals to the sum of the offset value and the first $T_{delta}$ value. In another example, different timing modes indicate whether to offset the first $T_{delta}$ value. If the timing mode is configured as Case 1 timing, the IAB node determines that the $T_{delta}$ value equals to the first $T_{delta}$ value. If the timing mode is configured as at least of Case 6 timing and Case 7 timing, the IAB node determines that the $T_{delta}$ value equals to the sum of the offset value and the first $T_{delta}$ value. In another example, different time resource types indicate whether to offset the first $T_{delta}$ value. For time resources that are configured as the first type resource, the IAB node determines that the $T_{delta}$ value equals to the first $T_{delta}$ value. For time resources that are configured the second type resource, the IAB node determines that the $T_{delta}$ value equals to the sum of the offset value and the first $T_{delta}$ value. In some embodiments, $\Delta T$ is provided by the parent node. In some embodiments, $\Delta T$ is predefined by the protocol. In some embodiments, the mapping relationship between whether to offset the first $T_{delta}$ value and any of indication information, timing mode, or time resource type can be predefined.

In some embodiments, the first node determines, based on configuration information of one of (1) the indication information, (2) the timing mode, or (3) the time resource type received from the second node, whether to offset from the first time difference value indicated by the second information or the first time difference information corresponding to a specific timing scene. In some embodiments, the first node determines the time difference value based on the second information and whether to offset from the first time difference value.

In some embodiments, the IAB node determines an offset value based on the indication information, and determines the value of $T_{delta}$ equals to the sum of the first $T_{delta}$ value and the offset value. The first $T_{delta}$ value is determined using a similar way as foregoing embodiments. In some embodiments, the first node determines, based on the indication information, an offset value relative to the first time difference value indicated by the second information, or relative to the first time difference information corresponding to a specific timing scene. In some embodiments, the first node determines the time difference value based on the offset value and the second information.

In some embodiments, the IAB node determines the value of $T_{delta}$ according to the third information. The third information comprises A bits to represent $2^A$ states. The X states of $2^A$ states indicate $T_{delta}$ values corresponding to one of table a, table d, the first part of table c, the first part of table f Each of X states corresponds to a $T_{delta}$ value. The Y states of the remaining states (e.g., $2^A-X$) indicate $T_{delta}$ values corresponding to one of table b table e, the second part of table c, the second part of table f. Each of Y states corresponds to a $T_{delta}$ value. In some embodiments, the third information comprises A bits to represent $2^A$ states. Each of X states of the $2^A$ states can correspond to a value of time difference information in the first time difference information table. Each of Y states of the remaining $2^A-X$ states can correspond to a value of time difference information in the second time difference information table. A sum of X and Y is less than or equal to $2^A$.

For example, X states of the 2 total states of the third information are 0,1,2, . . . ,X−1. The first $X_1$ states (e.g., 0,1,2, . . . ,$X_1$−1) correspond, respectively, to $T_{delta}$ values in the first part of Table f. Y states of the third information are: X, X+1, X+2, . . . , X+Y−1, where the first $Y_1$ states X, X+1, X+2, . . . , X+Y−1 correspond, respectively, $T_{delta}$ values in the second part of Table f. $X_1$ are less than or equal to X are less than or equal to Y. In an example, the values of $X_1$ and $Y_1$ may be related to the subcarrier spacing or frequency ranges. Different values of $X_1$ correspond to different subcarrier spacings, and difference values of $Y_1$ correspond to different subcarrier spacings.

In some embodiments, the second information is used to indicate the first time difference value (e.g, a time difference information index or a value) corresponding to the time difference information. In some embodiments, the time difference information is one of (1) 1/N of a time interval at the second node between a start of a UL Rx frame i for the first node and a start of a DL Tx frame i, wherein N is an integer, (2) timing advance amount, (3) timing advance adjustment amount which is an adjustment amount corresponding to the timing advance amount at a specific moment in time, (4) relative time difference information which is an adjustment amount corresponding to the time difference information at a specific moment, or (5) 1/N of a time interval at the second node between a start of a UL Rx frame i and a start of a DL Tx frame i, wherein N is an integer.

The parent node provides time difference information in several ways. In some embodiments, the second node (e.g., the parent node) sends, to a first node, one of (1) first information and second information, or (2) third information, wherein the first information comprises configuration information of at least one of indication information, timing mode, or time resource type. In some embodiments, the first node determines time difference information according to the one of (1) the first information and the second information, or (2) the third information.

In some embodiments, the second node sends first information and second information, where the first information includes configuration information of at least one of: indication information, timing mode, and time resource type; wherein the first information is used to indicate a range of time difference information, and the second information is used to indicate the first time difference information value.

In some embodiments, the first information is used to indicate the time difference information offset, and the second information is used to indicate the first time difference information value. In some embodiments, the first information is used to indicate one of a time difference information offset, wherein the time difference information offset is an offset relative to the first time difference information corresponding to a specific timing scene, whether to offset from the first time difference value indicated by the second information, or whether to reverse the first time difference value indicated by the second information.

In some embodiments, the second node sends third information, where different bit value ranges of the third information correspond to different time difference information tables. In some embodiments, the third information comprises bit value ranges, and different bit value ranges correspond to different time difference information tables.

In some embodiments, the time difference information offset and the second information are used to determine the time difference information. In some embodiments, the second information and whether to offset from the first time difference value are used to determine the time difference information. In some embodiments, the second information and whether to reverse the time difference value are used to determine the time difference information.

Optionally, the first information and the second information may be provided in any one of several ways. The first information can be provided through higher layer signaling, and the second information is provided through MAC CE. The first information and the second information can be provided through higher layer signaling. The first information and the second information can be provided through a MAC CE. In some embodiments, at least one of (1) the second node sends the first information via higher layer signaling, and the second information is received by the first node via Media Access Control (MAC) Control Element (CE), (2) the second node sends the first information and the second information via the higher layer signaling; or, (3) the second node sends the first information and the second information via MAC CE.

Optionally, the time difference information offset is an offset from the first time difference information corresponding to a specific timing scene, or is an offset from the first time difference value indicated by the second information. Optionally, the time difference information is 1/N times the time difference between the DL Tx timing and the UL Rx timing of the parent node, where N is an integer greater than or equal to 1 (in some embodiments, N is equal to 2).

Optionally, the third information is provided through higher layer signaling or MAC CE. In some embodiments, the second node sends the third information via Media Access Control (MAC) Control Element (CE) or higher layer signaling.

Optionally, the parent node sends relative time difference information, where the relative time difference information is an adjustment amount relative to time difference information at a specific moment. That is, the value of the time difference information is the sum of the time difference information value at a specific moment and the adjustment amount.

In some embodiments, the second information indicates the first time difference information value (e.g., $T_{delta}$ value) through an index (e.g., $T_{delta}$ index). In some embodiments, the second information indicates the first time difference information value.

In some embodiments, the parent node sends a $T_{delta}$ index (or a $T_{delta}$ value) and configuration information of at least one of the indication information, the timing mode, and the time resource type. The $T_{delta}$ index is used to indicate the $T_{delta}$ value. The configuration information is used to indicate a table or a portion of the table used to determine values or a value set or value range of the time difference information. In some embodiments, one of the indication information, the timing mode, and the time resource type indicates a table or a portion of the table used to determine values or a value set or value range of the time difference information. In some embodiments, the second information (e.g., $T_{delta}$ index) is used to indicate the time difference value.

In some embodiments, different $T_{delta}$ value ranges or $T_{delta}$ values can be defined for different timing modes. For example, for Case 1 timing, $T_{delta}$ value ranges of table a can be used. For Case 6 and Case 7 timing, $T_{delta}$ value ranges of table b can be used. In another example, different $T_{delta}$ value ranges can be defined for different time resource types of the MT and DU of the IAB node. The time resource types may include TDM, FDM, and SDM. For example, for TDM, $T_{delta}$ value ranges of table a can be used. For FDM and SDM, $T_{delta}$ value ranges of table b can be used. In another example, the indication information contains 1 bit, and different bit values indicate different $T_{delta}$ value range tables. For example, a bit value of 0 indicates that the $T_{delta}$ value range of table a is used. A bit value of 1 indicates that the $T_{delta}$ value range of table b is used. There is a mapping relationship between the $T_{delta}$ value range and the combination of the subcarrier spacing configuration. For example, for the subcarrier spacing configuration u=0 (that is, the subcarrier spacing is $2^{u}\cdot 15$ kHz, i.e., 15 kHz), the IAB node can determine the $T_{delta}$ value range to be [Min_a1, Max_a1].

In some embodiments, the parent node provides the subcarrier spacing corresponding to the $T_{delta}$ value range. The IAB node can determine the value range of $T_{delta}$ according to the selected/determined table and the configured subcarrier spacing. The IAB node can obtain the value of $T_{delta}$ according to the $T_{delta}$ index and the determined $T_{delta}$ value range. There is a mapping relationship between the $T_{delta}$ value and the combination of the $T_{delta}$ value range and $T_{delta}$ index. For example, for SCS 15 kHz, the $T_{delta}$ value range is [Min_a1, Max_a1], the granularity is K (unit $T_c$), and the $T_{delta}$ index i, the IAB node can determine the $T_{delta}$ value to be Min_a1+K·i, wherein i is a non-negative integer.

It is worth noting that the parent node can provide at least one of the subcarrier spacing configuration and $T_{delta}$ index. For example, at least one of the subcarrier spacing configuration and the $T_{delta}$ index is provided through at least one of higher layer signaling and MAC CE.

The parent node sends a $T_{delta}$ index (or a $T_{delta}$ value) and configuration information of at least one of the indication information, the timing mode, and the time resource type. The $T_{delta}$ index is used to indicate the first $T_{delta}$ value. The configuration information is used to indicate whether $T_{delta}$ uses an opposite number of the first $T_{delta}$ value. In some embodiments, one of the indication information, the timing mode, and the time resource type is used to indicate whether to reverse the first time difference value indicated by the second information (e.g., $T_{delta}$ index).

For example, the indication information includes 1 bit, and different bit values indicate whether $T_{delta}$ uses the opposite number. For example, a bit value of 0 indicates that the opposite number is not uses; a bit value of 1 indicates that the opposite number is used.

For example, when the timing mode is Case 1 timing or the time resource type is TDM multiplexed time resource, $T_{delta}$ does not use the opposite number. When the timing mode is Case 6 or Case 7 timing or the time resource type is FDM or SDM, $T_{delta}$ uses the opposite number.

When the indication information or timing mode or time resource type indicates that $T_{delta}$ does not use the opposite number, the $T_{delta}$ value equals to the first $T_{delta}$ value indicated by the first $T_{delta}$ index. In some embodiments, when the indication information or timing mode or time resource type indicates that $T_{delta}$ uses the opposite number, the $T_{delta}$ value is the reverse of the first $T_{delta}$ value indicated by the $T_{delta}$ index.

In some embodiments, the parent node sends indication information and a $T_{delta}$ index, where the indication information is used to determine a $T_{delta}$ offset; the $T_{delta}$ index is used to indicate a first $T_{delta}$ value. In some embodiments, the indication information is used to indicate an offset from the first time difference value indicated by the second information.

Optionally, the indication information is an indication of whether to offset, including 1 bit, and different bit values indicate whether to offset. For example, a bit value of 0 indicates no offset; a bit value of 1 indicates offset. In some embodiments, one of the indication information, the timing mode, and the time resource type is used to indicate whether to offset from the first time difference value indicated by the second information.

Alternatively, the parent node sends a configuration information of one of timing mode or a time resource type to indicate whether to offset. For example, when the timing mode is Case 1 timing, or the time resource type is TDM multiplexed time resource, $T_{delta}$ value does not need to offset. When the timing mode is Case 6 or Case 7 timing or the time resource type is FDM or SDM, the $T_{delta}$ value needs to offset.

When the configuration information of one of the indication information or timing mode or time resource type indicates that $T_{delta}$ value does not need to offset relative to the first $T_{delta}$ value, the $T_{delta}$ value equals to the first $T_{delta}$ value indicated by the $T_{delta}$ index; when the configuration information of one of the indication information or timing mode or time resource type indicates $T_{delta}$ value needs to offset relative to the first $T_{delta}$ value, the $T_{delta}$ value equals to the sum of the first $T_{delta}$ value and the offset value $\Delta T$. Among them, $\Delta T$ is predefined by the protocol or provided to the IAB node through higher layer signaling or MAC CE.

Optionally, the indication information is an offset $\Delta T$, and the $T_{delta}$ value equals to the sum of the first $T_{delta}$ value indicated by the $T_{delta}$ Index and the offset value $\Delta T$.

In some embodiments, the parent node sends third information. The third information is used to determine a value of $T_{delta}$, where different bit value ranges of the third information correspond to different time difference information tables. In some embodiments, the third information is used to determine the time difference value, different bit value ranges of the third information correspond to different time difference information tables.

Different $T_{delta}$ value ranges are defined for different timing modes. For example, for the Case 1 timing, $T_{delta}$ values is defined as shown in Table a, Table d the first part of table c, the first part of table f. For Case 6 and Case 7 timing, $T_{delta}$ values is defined as shown in Table b, Table e, the second part of table c, or the second part of table f.

Or, different $T_{delta}$ values are defined for different resource multiplexing modes of the MT and DU of the IAB node. For example, for TDM, $T_{delta}$ values is defined as shown in Table a, Table d the first part of table c, the first part of table f. For FDM and SDM, $T_{delta}$ values is defined as shown in Table b, Table e, the second part of table c, or the second part of table f.

The third information uses the X states of the $2^A$ states represented by the A bits to represent the values of $T_{delta}$ corresponding to the first time difference information table (e.g., Table d), and the Y states of the remaining $2^A-X$ states to represent the values of $T_{delta}$ corresponding to the second time difference information table (e.g., Table e). In some embodiments, the third information comprises A bits to represent $2^A$ states. In some embodiments, each of X states of the $2^A$ states corresponds to the time difference value in the first time difference information table. In some embodiments, each of Y states of the $2^A-X$ states corresponds to a value of time difference information in the second time difference information table. In some embodiments, a sum of X and Y less than or equal to $2^A$.

In all the above embodiments, the parent node may be at least one of the following: an IAB node, an IAB donor, a centralized unit CU, OAM, an IAB node DU, an IAB donor DU, and a serving cell. In the above embodiment, the tables a-f only represent different tables, and do not limit the numbers and names of the actual tables. In all the above embodiments, time difference information (e.g., $T_{delta}$, $N_{TA}$, etc.), can adopt a finer granularity, such as the granularity is 64 Tc for frequency range 1 and 32 $T_c$ for frequency range 2; or a value less than 64 Tc or 32 Tc, or a value related to carrier spacing configuration and equals to or less than 32 Tc, or other value. In all the above embodiments, time difference values are defined in the form of table. The time difference values can also be defined in the form of functions. There is a mapping between time difference index k and time difference value. Take time difference value $T_{delta}$ as an example, $T_{delta}=T_0+k \cdot s$ in unit of $T_c$. Where $T_0$ is the minimum value of Tdelta values, k is a non-negative integer. s is the step size or granularity. Different frequency ranges corresponds to different s. Different functions can be defined for different timing modes or resource multiplexing types or time resource types. The method of determining time difference information when time difference is defined in the form of function is similar to that when time difference information is defined in the form of table (e.g., replace table with function). In the case of no conflict, all the above embodiments can be arbitrarily combined.

Figure 9:
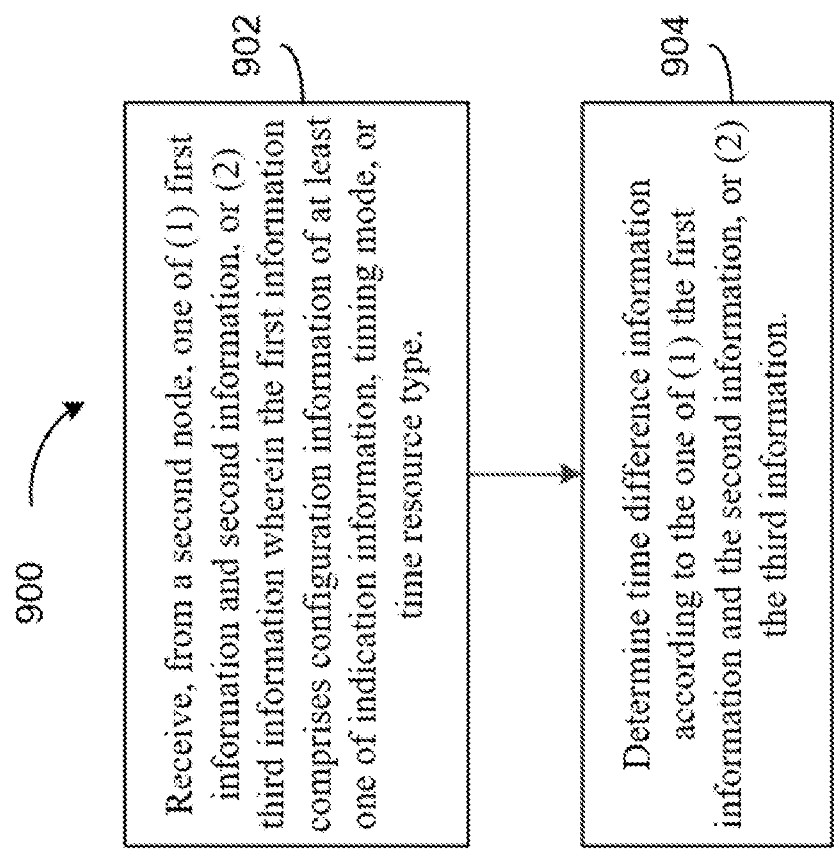
FIG. 9 illustrates a flowchart diagram illustrating a method of receiving information, in accordance with some embodiments of the present disclosure.

FIG. 9 illustrates a flowchart diagram illustrating a method 900 of receiving information, in accordance with some embodiments of the present disclosure. Referring to FIGS. 1-8, the method 900 can be performed by a first node, in some embodiments. Additional, fewer, or different operations may be performed in the method 900 depending on the embodiment.

A first node receives, from a second node, one of (1) first information and second information, or (2) third information (902). The first information includes configuration information of at least one of indication information, timing mode, or time resource type. The first node determines time difference information according to the one of (1) the first information and the second information, or (2) the third information (904).

Figure 10:
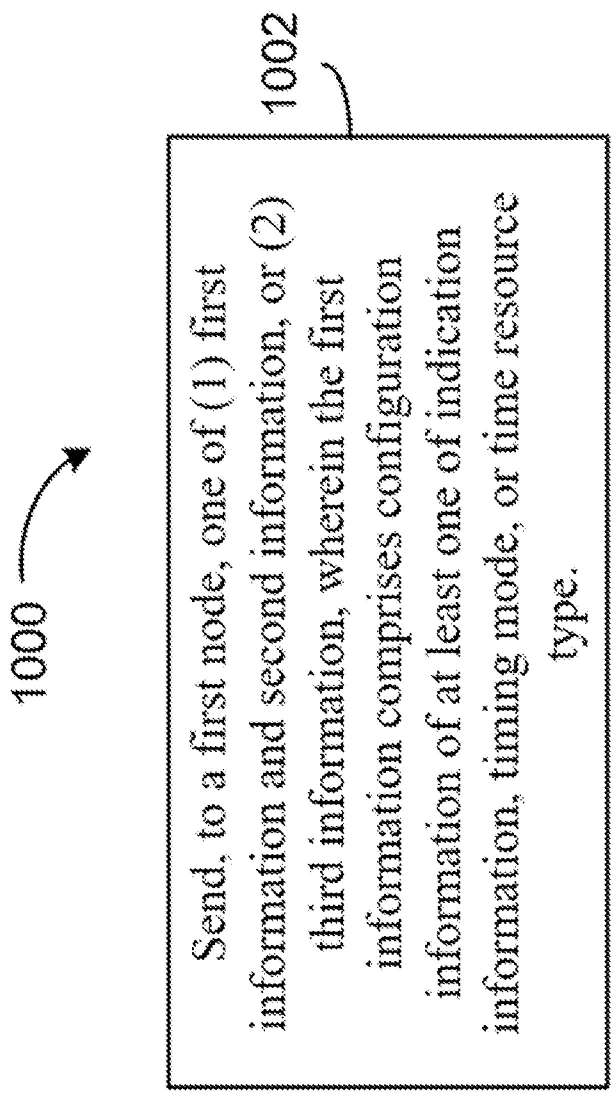
FIG. 10 illustrates a flowchart diagram illustrating a method of sending information, in accordance with some embodiments of the present disclosure.

FIG. 10 illustrates a flowchart diagram illustrating a method 1000 of sending information, in accordance with some embodiments of the present disclosure. Referring to FIGS. 1-9, the method 1000 can be performed by a second node, in some embodiments. Additional, fewer, or different operations may be performed in the method 1000 depending on the embodiment.

A second node sends, to a first node, one of (1) first information and second information, or (2) third information (1002). The first information includes configuration information of at least one of indication information, timing mode, or time resource type. In some embodiments, the first node determines time difference information according to the one of (1) the first information and the second information, or (2) the third information.

Figure 11:
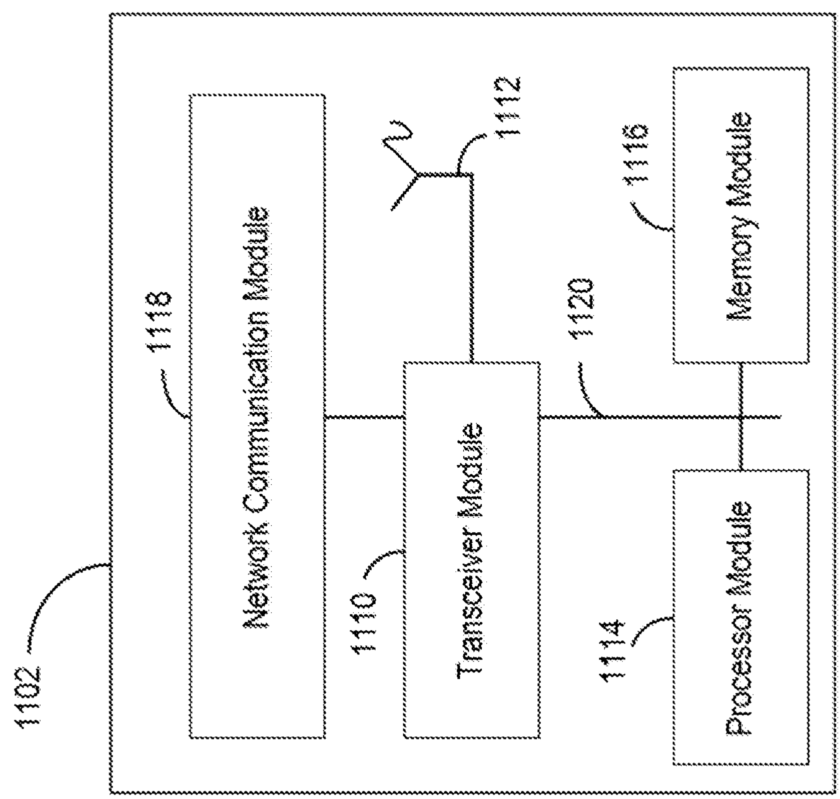
FIG. 11 illustrates a block diagram of an example communication node, in accordance with some embodiments of the present disclosure.

FIG. 11 illustrates a block diagram of an example communication node 1102, in accordance with some embodiments of the present disclosure. Referring to FIGS. 1-10, the communication node 1102 is an example implementation of the first node, the second node, or the third node as described herein.

The communication node 1102 can include components and elements configured to support known or conventional operating features that need not be described in detail herein. In one illustrative embodiment, the communication node 1102 can be used to communicate (e.g., transmit and receive) data symbols in a wireless communication environment, as described above. For instance, the communication node 1102 can be a communication node used to implement various network functions.

The communication node 1102 includes one or more a transceiver module 1110, an antenna 1112, a processor module 1114, a memory module 1116, and a network communication module 1118. The modules 1110, 1112, 1114, 1116, and 1118 are operatively coupled to and interconnected with one another via a data communication bus 1120. The communication node 1102 communicates with another communication node (such as but not limited to, the communication node 1102) via a communication channel, which can be any wireless channel or other medium suitable for transmission of data as described herein.

In some examples, the communication node 1102 can further include any number of modules other than the modules shown in FIG. 10. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the transceiver module 1110 includes a radio frequency (RF) transmitter and a RF receiver each including circuitry that is coupled to the antenna 1112. A duplex switch (not shown) may alternatively couple the RF transmitter or receiver to the antenna in time duplex fashion. A duplex switch may alternatively couple the RF transmitter or receiver to the antenna 1112 in time duplex fashion. The operations of the transceiver module 1110 can be coordinated in time with the transceiver module of another communication node such that the receiver circuitry is coupled to the antenna 1112 for reception of transmissions over a wireless transmission link at the same time that the transmitter of the other communication node is coupled to an antenna of the other communication node. In some embodiments, there is close time synchronization with a minimal guard time between changes in duplex direction.

The transceiver module 1110 and the transceiver module (such as but not limited to, the transceiver module 1110) of another communication node are configured to communicate via the wireless data communication link, and cooperate with a suitably configured RF antenna arrangement that can support a particular wireless communication protocol and modulation scheme. In some illustrative embodiments, the transceiver module 1110 is configured to support industry standards such as the Long Term Evolution (LTE) and emerging 5G standards, and the like. It is understood, however, that the present disclosure is not necessarily limited in application to a particular standard and associated protocols. Rather, the transceiver module 1110 may be configured to support alternate, or additional, wireless data communication protocols, including future standards or variations thereof.

The processor module 1114 can be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor module 1114, respectively, or in any practical combination thereof. The memory module 1116 may be realized as RAM memory, flash memory, ROM memory, EPROM memory, EEPROM memory, registers, a hard disk, a removable disk, a CD-ROM, or any other form of storage medium known in the art. In this regard, memory module 1116 may be coupled to the processor module 1114, respectively, such that the processor module 1114 can read information from, and write information to, the memory module 1116. The memory module 1116 may also be integrated into the processor module 1114. In some embodiments, the processor module 1114 may include a cache memory for storing temporary variables or other intermediate information during execution of instructions to be executed by processor module 1114. The memory module 1116 may also include non-volatile memory for storing instructions to be executed by the processor module 1114.

The network communication module 1118 generally represents the hardware, software, firmware, processing logic, and/or other components of the communication node 1102 that enable bi-directional communication between the transceiver module 1110 and other network components and communication nodes in communication with the communication node 1102. For example, the network communication module 1118 may be configured to support internet or WiMAX traffic. In a deployment, without limitation, the network communication module 1118 provides an 802.3 Ethernet interface such that the transceiver module 1110 can communicate with a conventional Ethernet based computer network. In this manner, the network communication module 1118 may include a physical interface for connection to the computer network (e.g., Mobile Switching Center (MSC)). In some embodiments, the network communication module 1118 includes a fiber transport connection configured to connect the communication node 1102 to a core network. In the examples in which the communication node is a wireless communication device (e.g., a UE or a terminal), the communication node 1102 may not include the network communication module 1118.

The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method, comprising:

receiving, by a first node from a second node of a wireless communication network, first information and second information, wherein the first information comprises configuration information of at least one of indication information, timing mode, or time resource type;

determining, by the first node, time difference information offset relative to a first time difference value indicated by the second information based on the first information;

determining, by the first node, whether to reverse the first time difference value indicated by the second information based on the first information, or whether to reverse the first time difference value corresponding to a specific timing scene; and determining, by the first node, time difference information according to the time difference information offset indicated by the first information, the first time difference value indicated by the second information, and whether to reverse the first time difference value, the time difference information having a time difference value; and adjusting, by the first node, at least one of uplink transmission timing or downlink transmission timing based on the time difference information.

2. The method of claim 1, further comprising determining, by the first node, the time difference information according to the time difference information offset and the second information; or determining, by the first node, the time difference value based on the second information and whether to offset from the first time difference value.

3. The method of claim 1, wherein the second information is received by the first node via Media Access Control (MAC) Control Element (CE).

4. The method of claim 1, wherein at least one of:

the first information is received by the first node via higher layer signaling, and the second information is received by the first node via Media Access Control (MAC) Control Element (CE);

the first information and the second information are received by the first node via the higher layer signaling; or the first information and the second information are received by the first node via MAC CE.

5. The method of claim 1, further comprising: in response to receiving the time difference information, adjusting, by the first node, at least one of uplink transmission timing or downlink transmission timing.

6. The method of claim 1, further comprising:

determining, by the first node based on the indication information, an offset from the first time difference value indicated by the second information; and determining, by the first node, the time difference value based on the offset and the second information.

7. The method of claim 1, further comprising:

determining, by the first node based on one of the indication information, the timing mode, and the time resource type received from the second node, whether to offset from the first time difference value indicated by the second information; and determining, by the first node, the time difference value based on whether to offset from the time difference value and the second information.

8. The method of claim 1, wherein the second information is used to indicate the first time difference value corresponding to the time difference information.

9. The method of claim 1, wherein the time difference information is one of 1/N of a time interval at the second node between a start of a $UL_{Rx}$ frame i for the first node and a start of a $DL_{Tx}$ frame i, wherein N is an integer; timing advance amount; timing advance adjustment amount which is an adjustment amount corresponding to the timing advance amount at a specific moment in time; and relative time difference information which is an adjustment amount corresponding to the time difference information at a specific moment in time.

10. A first node, comprising:

at least one processor configured to:

receive, via a receiver from a second node of a wireless communication network, first information and second information, wherein the first information comprises configuration information of at least one of indication information, timing mode, or time resource type;

determine time difference information offset relative to a first time difference value indicated by the second information based on the first information;

determine whether to reverse the first time difference value indicated by the second information based on the first information, or whether to reverse the first time difference value corresponding to a specific timing scene; and determine time difference information according to the time difference information offset indicated by the first information, the first time difference value indicated by the second information, and whether to reverse the first time difference value, the time difference information having a time difference value; and adjust at least one of uplink transmission timing or downlink transmission timing based on the time difference information.

11. A wireless communication method, comprising:

sending, by a second node to a first node of a wireless communication network, first information and second information, wherein the first information comprises configuration information of at least one of indication information, timing mode, or time resource type, which enables the first node to determine time difference information offset relative to a first time difference value indicated by the second information based on the first information, determine whether to reverse the first time difference value indicated by the second information based on the first information, or whether to reverse the first time difference value corresponding to a specific timing scene, determine according to the time difference information offset indicated by the second information, the first time difference value indicated by the second information, and whether to reverse the first time difference value, the time difference information having a time difference value, and adjust at least one of uplink transmission timing or downlink transmission timing based on the time difference information.

12. A second node of a wireless communication network, comprising:

at least one processor configured to:

send, via a transmitter to a first node of the wireless communication network, first information and second information, wherein the first information comprises configuration information of at least one of indication information, timing mode, or time resource type, which enables the first node to determine time difference information offset relative to a first time difference value indicated by the second information based on the first information, determine whether to reverse the first time difference value indicated by the second information based on the first information, or whether to reverse the first time difference value corresponding to a specific timing scene, determine time difference information according to the time difference information offset indicated by the second information, the first time difference value indicated by the second information, and whether to reverse the first time difference value, the time difference information having a time difference value, and adjust at least one of uplink transmission timing or downlink transmission timing based on the time difference information.

* * * * *